Patented Oct. 28, 1947

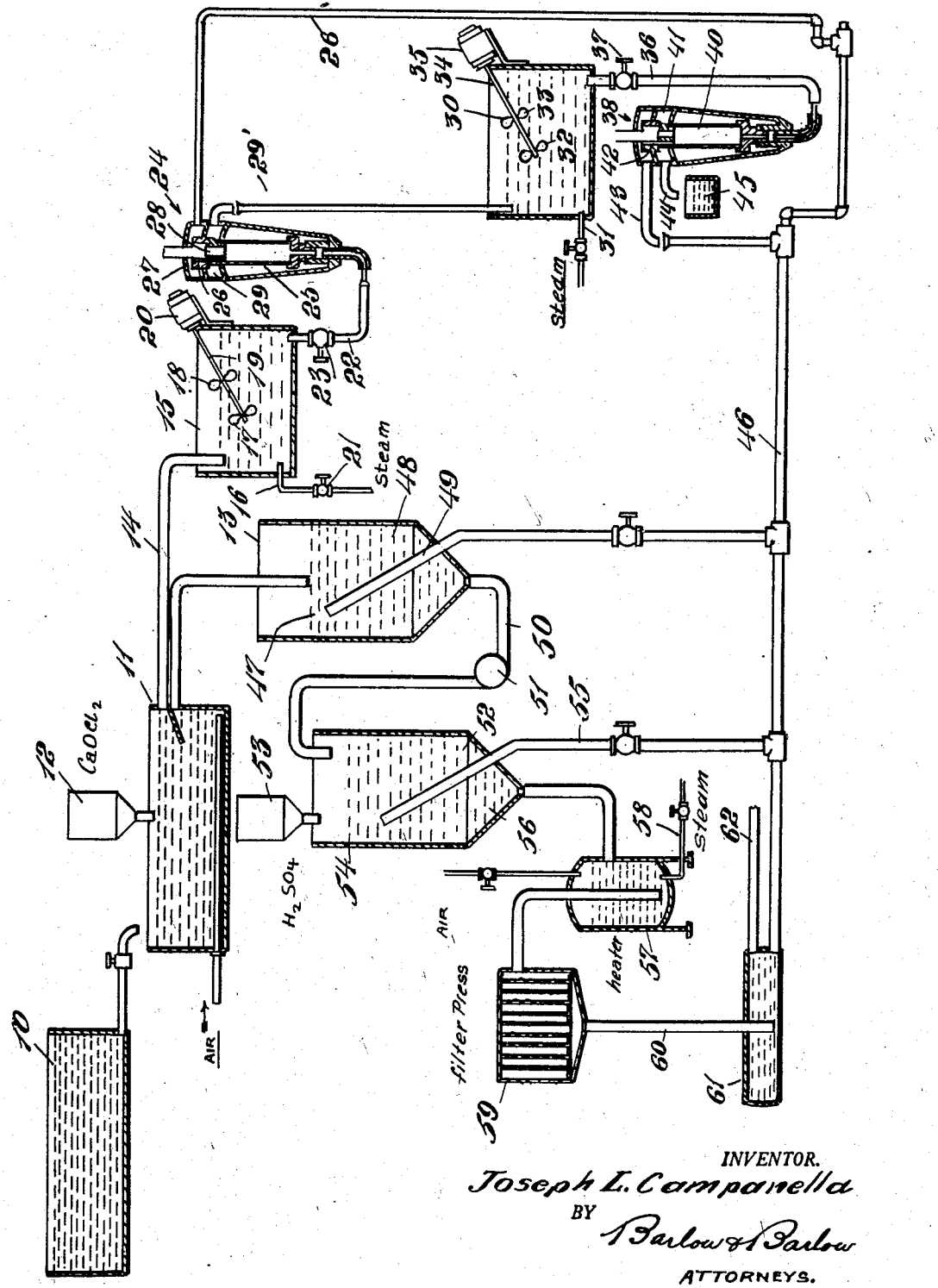

2,429,868

UNITED STATES PATENT OFFICE 2,429,868

PROCESS FOR TREATING WOOL SCOUR WATER WITH CALCIUM HYPOCHLORITE

Joseph L. Campanella, Bristol, R. I., assignor to Fields Point Manufacturing Corporation, a corporation of Rhode Island Application June 7, 1946, Serial No. 675,175

14 Claims. (Cl. 210—2)

This invention relates to the process of treating wool scour waters to render them sufficiently clear and odor free to be discharged into sewers or open water courses and to recover wool grease from such waters.

Raw wool must be scoured as a first step in its processing. The wool passes through a series of scouring bowls which removes therefrom much foreign matter which is carried thereby. The wool is continuously fed through such scouring bowls and there continuously comes from such scouring bowls the wool scour water which contains promiscuous dirt, grease, protein matter largely albuminous, manure urea also some burrs, straw, and soap which may have come over from the scouring bowls. The scour water with this foreign matter is objectionable both from the standpoint of the solid matter which it contains and the foul odors which come from it and is unsuitable in this state to enter any open streams or sewers.

One of the objects of this invention is to so treat this scour water that it will be odor free and sufficiently clear to be discharged into open streams or sewers.

Another object of this invention is to obtain this beneficial result by treating this scour water with a minimum number of operations.

Another object of this invention is to recover the wool grease which may be obtained from said scour water with a minimum amount of foreign matter, which grease at the present time is sufficiently valuable to pay for the process of treating this scour water.

Another object of this invention is to obtain two types of greases, a low and high grade, to conform with the prevailing demand and market prices.

Another object of this invention is to make use of the differences of specific gravities in separating the grease.

Another object of this invention is to treat the scour water so as to neutralize it to its iso-electric point thereby causing separation of the grease, soap, alkali, dirt, and water.

Another object of the invention is to provide a more granular proteinate in the treatment of the scour water so that this may be more completely filtered out in a later step in the process.

Another object of this invention is to utilize the chemicals for reaction which may be easily and inexpensively obtained, that the cost of the process may be reduced to a minimum.

Another object of the invention is to provide a process which may be operated continuously, directly and immediately upon scour water as it comes from scouring the wool with the treatment performed prior to collection or decomposition of the organic content of the scour water.

Another object of the invention is the provision of a process which may be carried out without the necessity of providing expensive treating equipment.

With these and other objects in view, the invention consists of certain novel features of construction, as will be more fully described and particularly pointed out in the appended claims.

In the accompanying drawing, the figure is a diagrammatic view illustrating the travel of the scour water through its various treatments.

In proceeding with this invention the overflow from the scouring bowls, one of which I have illustrated in the drawing and which overflow is at approximately 110° F. is conducted to a reaction chamber, where treatment is had with calcium hypochlorite. This treatment makes possible the discharge of the wool scouring liquid directly into an open stream without objectionable odor which could not be done before. During the reaction, in the reaction chamber, with calcium hypochlorite and air there separates along with the heavier solids and liquid a lighter solid which is skimmed from the discharge end of the reactor. This is allowed to flow into a mixing tank of water having suitable heating capacity to maintain a temperature of approximately 190° F. constantly. After standing several minutes it is separated by means of a centrifuge which discharges a high quality grease of high moisture content, and water, said water and grease being discharged into another mixing tank of water having suitable heating capacity to maintain a constant temperature of approximately 190° F. From this it is again centrifuged to obtain a high quality grease of low moisture content and water which is discharged into any open stream or sewer without any objectionable qualities. This type grease which has a high market value can be recovered in sufficient quantity to pay for the additional equipment, and should the market value of the low grade drop to an uneconomical point, then this high type grease would be recovered only, with the rest of the operation taking care of the nuisance and objectionable qualities of the treated scour water. The heavier solids and liquid overflows to a settling tank. After one settling tank is full the conduit which fills this settling tank is directed to another tank to fill the second tank and so on. The grease is recovered from the sludge which settles by reaction with acid and filtering through a press.

Calcium hypochlorite either $Ca(ClO)_2$ or $CaOCl_2$ is continuously fed from a supply tank 12 through a pipe controlled by a valve into the reaction chamber to add to the continuously flowing scour water. The calcium hypochlorite is dissolved in water preferably to a strength of approximately 8% and is fed to the reaction chamber so that the relative flows of the scouring liquid and the calcium hypochlorite solution will be thirty-five parts of scouring water to one part of the calcium hypochlorite solution. A strong solution may be used, however, up to 70% being satisfactory. In this latter case less will be used, the quantity being such as to maintain the same proportion. The calcium hypochlorite becomes thoroughly mixed with the scouring water in the reaction chamber which is substantially assisted by a diffusion medium into which air is conducted so that bubbles of very small size will percolate upwardly through the liquid and serve to thoroughly bring the calcium hypochlorite into contact with the foreign matter carried by this scouring water.

The quantity of calcium hypochlorite which is used will be sufficient to obtain a complete reaction with the foreign matter carried by the water and will vary somewhat depending upon the amount of foreign matter which is in the water. An operator may readily judge by the appearance of the liquid whether the foreign matter is all being reacted so as to provide a good separation or curdling of the scouring liquid. Usually about five minutes after the scouring water has entered the reaction chamber and mixed with the calcium hypochlorite a separation will be apparent.

A typical scour water designated 10 in the drawing which is encountered in the trade will contain by weight albuminous matter from .5 to 1%, dirt or sand from 2.3 to 3%, grease 1 to 3%, alkali $Na_2CO_3$ one-half of one per cent, soap .1 to .5%, manure and urea compounds not over 1%, burrs, straw, and the like .25 to .5%. This scour water is conveyed to a reaction chamber 11. A treatment by the calcium hypochlorite from a source 12 reacts with the manure, urea compounds, and straw, to drive off ammonia and leave an organic sludge free from objectionable odor, changes the alkali to calcium carbonate $CaCO_3$, the soap to calcium soap which is generally insoluble, and causes the albuminous matter to have a granular porous form which exists either as free protein or a calcium proteinate. The granular form of this protein or calcium proteinate is exceedingly desirable for later separation.

The calcium hypochlorite is added in a quantity to reduce the pH of the entire mass to between 7.2 and 7.6 it being found that the isoelectric point where the curd is obtained is between a pH of 7 and 8. This treatment alone makes possible a change sufficient so that the scour water may be discharged directly into an open stream but valuable solids are present which are desired to be recovered.

After curdling occurs the liquid in tank 11 and heavier solids overflows from the reaction chamber 11 into a settling tank 13 and as the tank is filled the conduit is then directed to another tank until that is filled and then to another tank and so on while the lighter solids are skimmed off of the reaction chamber 11 by a conduit 14 to a washing tank 15 to be separated by difference in specific gravity and obtain a high quality grease.

The lighter solids in tank 15 are washed by the insertion of steam into the tank as at 16 which steam serves to heat the contents of the tank up to approximately 190° Fahrenheit. The contents of the tank in addition to agitation by the steam which is inserted in the bottom is stirred by the revolving paddles 17 and 18 on shaft 19 operated by electric motor 20. The insertion of steam is controlled by a valve 21.

The washed and mixed lighter solids are then transferred through conduit 22 having the valve 23 therein to a centrifuge designated generally 24, the solids entering the bottom of the centrifuge which is revolving at a high rate of speed. This centrifuge serves to separate the light grease from such water as may have been mixed with this grease in the bowl 25 by throwing the heavier water to the outside where it is drained off through a conduit 26 to the upper chamber 27 and maintaining the lighter grease in the center portion of bowl 25 which is conveyed through conduit 28 to the lower chamber 29 of the centrifuge where it is drained off by the conduit 29' to another tank 30 which has a steam inlet 31 and an agitator 32, 33 on shaft 34 driven by motor 35 where the grease is again washed and is then discharged through conduit 36 having control valve 37 to a second centrifuge designated 38 where the process is repeated, the heavier water being thrown to the outside of the bowl 40 and the lighter grease being retained in the center part of the bowl 40 where it is drawn off to the chamber 41 while the heavier water is drawn off from the outer part of the bowl as at 42 and discharged as at 43 while the grease is collected through the discharge conduit 44 into the collecting or storage chamber 45 in a condition where it contains a very low moisture content and is suitable for use.

After a tank 13 is filled with the liquid and heavier solids it is permitted to stand six hours or more, preferably eight hours or more, during which the slimy solids or sludge precipitates, there being a clear liquid at 47 and a slimy flowable sludge 48 at the bottom of the settling tank 13 indicated in the drawing. The clear liquor 47 is decanted by some suitable decanting arrangement designated generally 49 into a drain 46 and is sufficiently cleared so that no objectionable solid matter or odor is present. This sludge 48 which still contains more than half water is transferred by flowing it through conduit 50 by pump 51 from the settling tank 13 into another settling tank 52 and there is treated with a concentrated mineral acid from supply 53 which is added in a quantity sufficient to provide a pH of between 4 and 6. A solution having a pH of 4.7 is probably best for the press operation which is to follow. At this acidity the soap present, probably a calcium soap, is least soluble and may best be separated from the grease which is to be recovered. However, satisfactory results may be obtained with a pH of between four and six as above indicated. The mineral acid reacts with the calcium carbonate of the sludge to produce an insoluble calcium salt which would be a sulphate if sulphuric acid were used, water and carbon dioxide and causes the sludge to be more compact freeing perhaps forty per cent of the water which is contained in the sludge which enters the reaction chamber.

After this treatment with the mineral acid the whole is then permitted to settle for six hours or more, preferably eight hours or longer. Decanting then takes place of this clear liquor 54 through conduit 55 to the drain 46 leaving the sludge 56 which consists primarily of grease, dirt, insoluble soap, and protein in a desired granular state. This sludge is then drained to the heater 57 and then heated to substantially 200° F. by steam through conduit 58 and conducted through a filter press 59 with steam which filters out the insoluble soap, the granular form protein and organic sludge and dirt leaving the water and free wool grease which will readily separate for recovery of the grease. This grease separates from the water at temperatures between 175–200° F. and may be drained through conduit 60 to grease separator 61. The grease being recovered through conduit 62 and the water discharging to the drain 46. This grease is of a lower grade than that recovered in the centrifuge.

At the present time the value of the lower grade wool grease in this relatively pure state is sufficient to pay for the use of this process in clearing up the waste and offensive wool scouring water which cannot well be put into a sewer or any open streams to be conducted away.

This application is a continuation in part of my prior application, Serial No. 506,836, filed October 19, 1943.

I claim:

1. A process for treating wool scour waters containing albuminous matter, soap, and alkali, comprising introducing calcium hypochlorite therein in a quantity sufficient to obtain a curd of the foreign matter carried by the waters.

2. A process for treating wool scour waters containing albuminous matter, soap, and alkali, comprising introducing calcium hypochlorite therein in a quantity sufficient to cause the pH to be between 7 and 8.

3. A process for treating wool scour waters containing albuminous matter, soap, and alkali, comprising introducing calcium hypochlorite therein in a quantity sufficient to cause the pH to be between 7.2 and 7.6.

4. A process for treating wool scour waters, consisting in introducing calcium hypochlorite therein in a quantity sufficient to obtain a curd of the foreign matter carried by the waters and passing air bubbles through said water while introducing said calcium hypochlorite.

5. A process for treating wool scour waters containing albuminous matter, soap and alkali comprising introducing calcium hypochlorite therein in a quantity sufficient to obtain a curd of the foreign matter carried by the waters and settling said curd in a quiescent tank.

6. A process for treating wool scour waters containing albuminous matter, soap and alkali comprising introducing calcium hypochlorite therein in a quantity sufficient to obtain a curd of the foreign matter carried by the waters and settling said curd in a quiescent tank, decanting the clear liquor and treating the sludge with mineral acid in a quantity to acidify to a pH ranging from 4 to 6 and settling in a quiescent tank.

7. A process for treating wool scour waters, containing albuminous matter, soap and alkali, comprising introducing calcium hypochlorite therein in a quantity sufficient to obtain a curd of the foreign matter carried by the waters settling said curd in a quiescent tank, decanting the clear liquor, treating the sludge with mineral acid in a quantity to acidify to a pH ranging from 4 to 6, settling in a quiescent tank, decanting and passing the precipitate with steam through a filter press to remove the dirt, soap and protein.

8. A process for treating wool scour waters containing albuminous matter, soap and alkali, comprising introducing calcium hypochlorite therein in a quantity sufficient to obtain a curd of the foreign matter carried by the waters, settling said curd in a quiescent tank, decanting the clear liquor and treating the sludge with mineral acid in a quantity to acidify to a pH ranging from 4 to 6, settling in a quiescent tank, decanting and passing the sludge with steam into a filter press to remove the dirt, insoluble soaps, and proteins and then separating the water and grease.

9. A continuous process for treating wool scour waters containing albuminous matter, soap and alkali comprising flowing the waste scour water into a chamber and from thence to a settling tank, treating the water while in the chamber with calcium hypochlorite in a sufficient quantity to cause a curd of the foreign matter to be formed.

10. A continuous process for treating wool scour waters containing albuminous matter, soap and alkali comprising flowing the waste scour water into a chamber and from thence to a settling tank, treating the water while in the chamber with calcium hypochlorite in a sufficient quantity to cause a curd of the foreign matter to be formed and permitting said curd to settle in said settling tank.

11. A process for treating wool scour waters containing albuminous matter, soap, and alkali, comprising introducing calcium hypochlorite therein in a quantity sufficient to obtain a curd of the foreign matter carried by the waters and separating said curd from the water centrifugally and drawing therefrom water at the outer portion of the rotating mass and grease at the inner portion thereof.

12. A process for treating wool scour waters containing albuminous matter, soap, and alkali, comprising introducing calcium hypochlorite therein in a quantity sufficient to obtain a curd of the foreign matter carried by the waters and washing said curd and then separating said curd from the water centrifugally and drawing therefrom water at the outer portion of the rotating mass and grease at the inner portion thereof.

13. A process for treating wool scour waters containing albuminous matter, soap, and alkali, comprising introducing calcium hypochlorite therein in a quantity sufficient to obtain a curd of the foreign matter carried by the waters, separating the lighter curd from the heavier curd and separately treating the separated curds to recover grease from each.

14. A process for treating wool scour waters containing albuminous matter, soap, and alkali, comprising introducing calcium hypochlorite therein in a quantity sufficient to obtain a curd of the foreign matter carried by the waters, separating the lighter curd from the heavier curd by skimming one from another and separately treating the separated curds to recover grease from each.

JOSEPH L. CAMPANELLA.

REFERENCES CITED

The following references are of record in the file of this patent:

UNITED STATES PATENTS

| Number | Name | Date |
| --- | --- | --- |
| 685,874 | Sharpless | Nov. 5, 1901 |
| 1,211,481 | Noble | Jan. 9, 1917 |
| 1,307,686 | Linden | June 24, 1919 |
| 1,418,013 | Newman | May 30, 1922 |
| 2,070,286 | Lissauer et al. | Feb. 9, 1937 |

FOREIGN PATENTS

| Number | Country | Date |
| --- | --- | --- |
| 197,033 | Great Britain | May 7, 1923 |